(12) United States Patent
Hamlin et al.

(10) Patent No.: US 12,482,005 B2
(45) Date of Patent: Nov. 25, 2025

(54) SYSTEMS AND METHODS FOR REDUCING CARBON DIOXIDE EMISSIONS USING TRUSTED ON-DEMAND DISTRIBUTED MANUFACTURING

(71) Applicant: Siemens Corporation, Washington, DC (US)

(72) Inventors: Teri Hamlin, Granbury, TX (US); Gregory Bowman, Lorton, VA (US); Barbara Humpton, Arlington, VA (US); Joseph Bonnin, Charlotte, NC (US); Alastair Orchard, Genua (IT)

(73) Assignee: Siemens Corporation, Washington, DC (US)

( * ) Notice: Subject to any disclaimer, the term of this patent is extended or adjusted under 35 U.S.C. 154(b) by 0 days.

(21) Appl. No.: 18/848,193

(22) PCT Filed: May 26, 2022

(86) PCT No.: PCT/US2022/030994
§ 371 (c)(1),
(2) Date: Sep. 18, 2024

(87) PCT Pub. No.: WO2023/229594
PCT Pub. Date: Nov. 30, 2023

(65) Prior Publication Data
US 2025/0209470 A1 Jun. 26, 2025

(51) Int. Cl.
*G06Q 20/00* (2012.01)
*G06Q 30/012* (2023.01)
(Continued)

(52) U.S. Cl.
CPC ......... *G06Q 30/018* (2013.01); *G06Q 30/012* (2013.01); *G06Q 50/04* (2013.01)

(58) Field of Classification Search
CPC .... G06Q 30/018; G06Q 30/012; G06Q 50/04; G06Q 10/04; G06Q 10/06; G06Q 10/00
(Continued)

(56) References Cited

U.S. PATENT DOCUMENTS

2009/0177505 A1  7/2009  Dietrich et al.
2020/0045538 A1* 2/2020  Dattawadkar ............. H04L 9/50

FOREIGN PATENT DOCUMENTS

WO    2020198409 A1    10/2020

* cited by examiner

*Primary Examiner* — Dante Ravetti

(57) ABSTRACT

A system (100) for reducing carbon dioxide emissions using trusted on-demand distributed manufacturing, with a processor (102) and a memory (104), includes a first interface (120) configured to receive product data from a product data source (110-A, 110-B, 110-N), a second interface (130) configured to exchange manufacturing data from a manufacturing data source (140-A, 140-B, 140-N), a matching module (174) configured via computer executable instructions to match the product data with the manufacturing data based on manufacturing characteristics for producing a product (154) as described in the product data, a carbon footprint module (180) configured via computer executable instructions to determine a traditional carbon footprint and an actual carbon footprint of the product (154), and determine a carbon dioxide reduction based on the traditional and the actual carbon footprint of the product (154), and wherein the system (100) is configured to automatically transmit the carbon dioxide reduction to a certification body (240).

13 Claims, 2 Drawing Sheets

(51) Int. Cl.
*G06Q 30/018* (2023.01)
*G06Q 50/04* (2012.01)

(58) Field of Classification Search
USPC .......................... 705/16, 21, 59; 380/44, 262
See application file for complete search history.

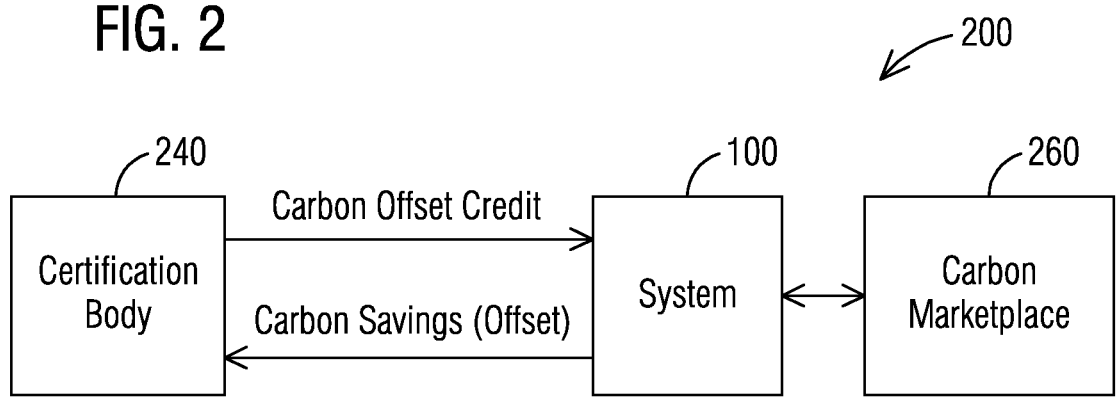
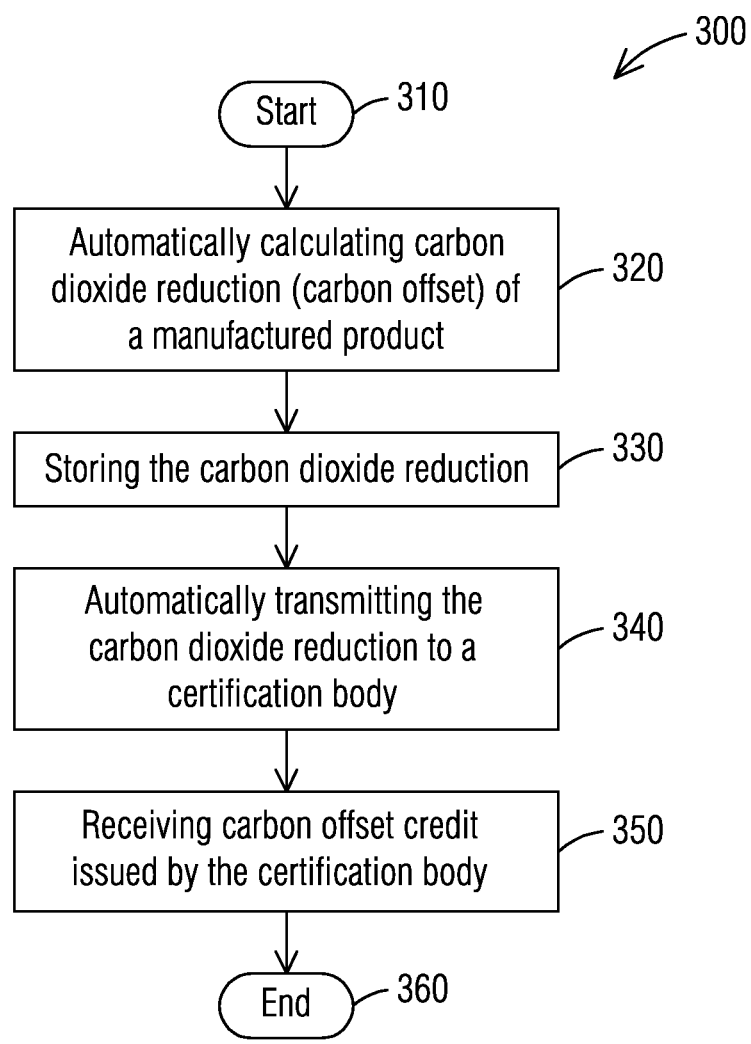

SYSTEMS AND METHODS FOR REDUCING CARBON DIOXIDE EMISSIONS USING TRUSTED ON-DEMAND DISTRIBUTED MANUFACTURING

BACKGROUND

1. Field

Aspects of the present disclosure generally relate to systems and methods for reducing carbon dioxide emissions using trusted on-demand distributed manufacturing.

2. Description of the Related Art

Individuals and corporations around the world are recognizing the importance of reducing greenhouse gases (GHG) emissions. Further, governments are passing the responsibility of emission reduction on to the industry. As a result, many companies and corporations are reducing carbon footprints through energy efficiency improvements and other measures. However, it is not always possible to meet targets and obligations or eliminate carbon footprints with internal reductions alone, such as energy efficiency improvements. An option to achieve emission reductions is to enter the carbon markets, for example by purchasing carbon offsets.

SUMMARY

Briefly described, aspects of the present disclosure generally relate to systems and methods for reducing carbon dioxide emissions using trusted on-demand distributed manufacturing.

The described systems and methods include a platform that connects creators, producers, and buyers in a powerful 3-sided marketplace. The marketplace holds manufacturable digital assets securely in digital escrow and requires a proof to standard, allowing rapid development, local manufacturing and lighter logistics while creating new revenue streams for all participants. Instead of producing and warehousing parts and shipping them to the point of need, the described systems and methods allow for trusted, genuine production at or near the point of need through distributed manufacturing as a service. Because of local manufacturing at or near the point of need, the described systems and methods provide a unique mechanism for lowering carbon dioxide emissions, herein shortly referred to as carbon emissions, while securing supply chains.

An aspect of the present disclosure provides a system for reducing carbon dioxide emissions using trusted on-demand distributed manufacturing including at least one processor and at least one memory, the system comprising a first interface configured to receive product data from a product data source, a second interface configured to exchange manufacturing data from a manufacturing data source, a matching module configured via computer executable instructions to match the product data with the manufacturing data based on manufacturing characteristics for producing a product as described in the product data, a carbon footprint module configured via computer executable instructions to determine a traditional carbon footprint and an actual carbon footprint of the product, and determine a carbon dioxide reduction based on the traditional and the actual carbon footprint of the product, and wherein the system is configured to automatically transmit the carbon dioxide reduction to a certification body.

Another aspect of the present disclosure provides a method for reducing carbon dioxide emissions using trusted on-demand distributed manufacturing, the method comprising through operation of at least one processor in a system, automatically calculating carbon dioxide reduction (carbon offset) of a manufactured product, storing the calculated carbon dioxide reduction, automatically transmitting the calculated carbon dioxide reduction to a certification body, and receiving carbon offset credit issued by the certification body.

BRIEF DESCRIPTION OF THE DRAWINGS

FIG. 2 illustrates a schematic diagram of a system for reducing carbon dioxide emissions including certification body and carbon marketplace in accordance with an exemplary embodiment of the present disclosure.

FIG. 3 illustrates a flowchart relating to a method for reducing carbon dioxide emission in accordance with an exemplary embodiment of the present disclosure.

DETAILED DESCRIPTION

Figure 1:
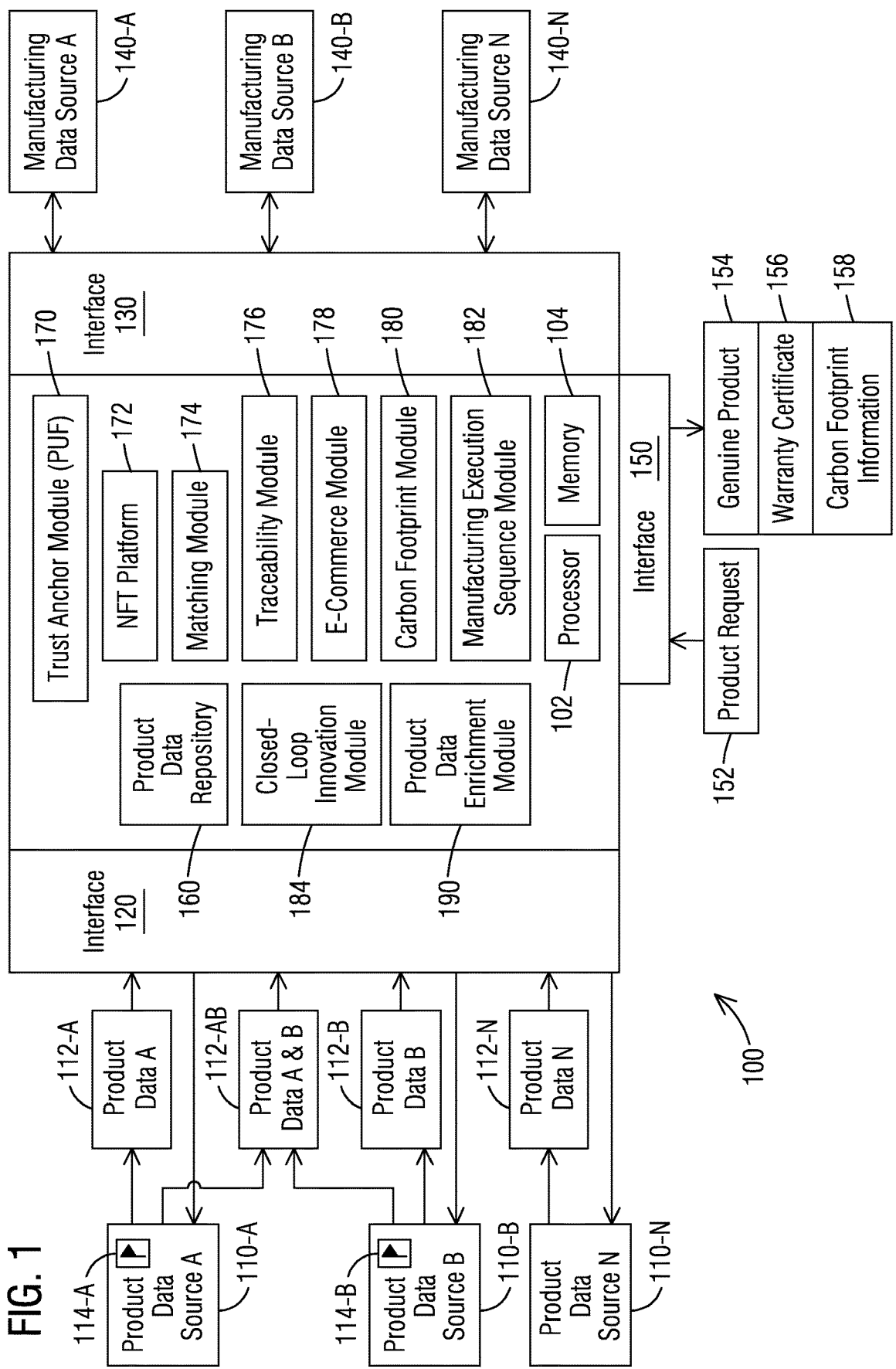
FIG. 1 illustrates a schematic diagram of a system for enabling design and trusted on-demand distributed manufacturing in accordance with an exemplary embodiment of the present disclosure.

To facilitate an understanding of embodiments, principles, and features of the present disclosure, they are explained hereinafter with reference to implementation in illustrative embodiments. In particular, they are described in the context of being systems and methods for reducing carbon dioxide emissions using trusted on-demand distributed manufacturing to a given standard. Embodiments of the present disclosure, however, are not limited to use in the described systems, devices or methods.

FIG. 1 illustrates a schematic diagram of a system 100 for enabling trusted on-demand distributed manufacturing in accordance with an exemplary embodiment of the present disclosure. The system 100 may herein also be referred to as exchange, platform, marketplace, or 3-sided marketplace.

An aspect of the system 100 includes securely storing and processing digital assets. Digital assets are generally described herein as product data, such as product data 112-A, 112-B, 112-N. Product data 112-A, 112-B, 112-N include many types of industrial or technical data and information, including but not limited to technical drawings, e.g. CAD drawings (discrete industries), formulations (process industries) material specifications, manufacturing instructions, product tolerances, quality targets etc.

According to an exemplary embodiment of the present disclosure, system 100 comprises a plurality of product data sources 110-A, 110-B, 110-N, wherein each data source 110-A, 110-B, 110-N comprises or provides the product data 112-A, 112-B, 112-AB, 112-N. The product data 112-A, 112-B, 112-AB, 112-N comprise a plurality of data and information relating to industrial product(s), such as for example a rear control arm or a gasket for an automobile, a seal or a bearing of an electromotor, and many different types of products or components in the fields of automotive, space, commercial equipment, pharmaceuticals, aerospace and defense, energy and power, oil and gas, medical devices, electronics, consumer packaged goods, food and beverage, footwear and apparel, etc. The data sources 110-A, 110-B, 110-N and data 112-A, 112-B, 112-AB, 112-N are digital data and data sources, and are provided, for example created, designed or generated, by creators, proprietors, or holders of the product data, i.e. digital assets.

As illustrated in FIG. 1, product data source 110-A comprises product data 112-A, data source 110-B comprises product data 112-B and product data source 110-N comprises product data 112-N. It should be noted that system 100 may comprise many more data sources than illustrated in FIG. 1, provided by many different creators, combination of creators, proprietors, or holders of product data.

In another embodiment, the system 100 may provide creators or holders of the product data sources 110-A, 110-B, 110-N with an additional, optional mechanism to commercialize their digital assets. For example, by setting a 'Allow Re-combination' flag 114-A, 114-B to true, a creator provides permission to other creators or users of the platform/system 100 to modify or amend the digital assets/product data. For example, other creators/users are allowed to extend a certain design of a component, or to re-combine a design with a design of another creator in order to derive a novel design that may be offered within the system 100. As FIG. 1 illustrates, both creators of product data sources 110-A and 110-B allow for re-combination by setting flag 114-A, 114-B, wherein new product data A&B have been created based on product data A and product data B, wherein the new product data A&B may include a new design for an automobile component. Such an extension or re-combination of digital assets/product data may only be performed online, i.e. while on or using the platform/system 100, thus not allowing downloading digital assets into a separate system for extension or re-combination in separate systems, such as third-party tools. Further, it should be noted that product data of original/source designs are not forfeit/lost to an extender/re-combinator. This means that when a buyer (costumer) requests a product to be manufactured of the novel (extended or re-combined) design, revenue is split with the creators from which it was partially derived.

The system 100 comprises a plurality of manufacturing data sources 140-A, 140-B, 140-N, that are digital data sources and are provided by producers and manufacturers of products or parts. It should be noted that system 100 may comprise many more manufacturing data sources than illustrated in FIG. 1, provided by many different producers or manufacturers. Producers or manufacturers provide production or manufacturing including processes or methods of product(s) that include subtractive manufacturing, additive manufacturing, robotic assembly, as well as traditional manufacturing/production methods that can be offered on the exchange as Manufacturing as a Service (MaaS) or Production as a Service (PaaS). The platform 100 provides opportunities and options for manufacturers and producers to 'sell', i.e. offer, production capabilities and manufacturing capacities for products that they can produce and sell.

The system 100 comprises a first interface 120, generally configured to provide, for example to collect, obtain or receive, the product data from the plurality of data sources 110-1, 110-2, 110-N. As indicated by the arrows in both directions between the first interface 120 and the product data sources 110-A, 110-B, 110-N, the system 100 and the product data sources 110-A, 110-B, 110-N interact with each other, for example exchange different data or information. On one hand, as noted, product data are submitted to the system 100, via the product data sources 110-A, 110-B, 110-N. On the other hand, feedback information or other data is provided by the system 100 back to the product data sources 110-A, 110-B, 110-N, which will be described later with reference to closed-loop innovation module 184.

Further, the system 100 comprises a second interface 130 generally configured to provide, for example to exchange manufacturing data from one or more manufacturing data sources 140-A, 140-B, 140-N. As indicated by the double arrows, manufacturers and the manufacturing data sources 140-A, 140-B, 140-N interact in multiple ways with the system 100.

The system 100 comprises a third interface 150 configured to receive a product request 152. Such a request 152 is created and placed by a customer/buyer who would like to buy certain product(s), for example seal(s) and/or bearing(s) for an electromotor. In an example, the third interface 150, i.e. customer interface, can be a web-based interface, or mobile application offered through an app-store. Customers/buyers may include original equipment manufacturers (OEMs), manufacturers (MFRs), distributors, integrators, end users. Generally, the product request 152 includes type and quantity of the requested product, along with manufacturing characteristics and criteria such as a timeline, materials, price, and/or manufacturing location, etc. Eventually, the customer/buyer will receive manufactured product(s), which is/are genuine product(s) 154, along with a (digital) warranty certificate 156 if the product(s) has/have been manufactured according to the specified manufacturing characteristics and criteria. Further, the customer/buyer may receive (digital) carbon footprint information 158, such as for example a carbon footprint calculation, and/or a carbon reduction calculation with respect to the manufactured and delivered product(s).

An interface as used herein, such as the interfaces 120, 130, 150 comprises or includes a type of mechanism for providing, including for example transferring, moving, exchanging, data from source(s) to one or more modules of the system 100. An example for an interface is a computing interface or software implemented interface which defines interactions between multiple software intermediaries. An example for a computing interface is an application programming interface (API), wherein the API interacts with separate software components or resources for providing, e.g. transferring or exchanging, data in an automated manner from the data sources to target application(s).

The system 100 may further comprise a repository 160 storing the product data 112-A, 112-B, 112-AB, 112-N. The repository 160 is configured to validate and/or classify the product data 112-A, 112-B, 112-AB, 112-N. Classification means that the product data 112-A, 112-B, 112-AB, 112-N is classified for example in different product categories, e.g. electric machines, automotive parts, medical devices etc.

Validation may include checking or verifying that necessary data and information for producing a product based on the product data are available and in a usable format. Such necessary data include basic shape data (e.g. technical/CAD drawings) of the product, and manufacturing characteristics including manufacturing instructions, quality targets and tolerances etc. for producing the product. All the information/data for a product including manufacturing characteristics are herein also referred to as rich product data.

Product data may be provided/uploaded to the system 100 in different ways, formats, or stages. For example, creators/owners may upload and/or publish complete rich product data of product(s). In another example, creators/owners may upload product data which are not enriched, i.e. information, such as manufacturing characteristics, may be missing. In such a case, digital asset validation fails, and product data enrichment module 190 of system 100 may be used to rectify a failed validation. For example, the product data enrichment module 190 may provide feedback to the creator/ owner, e.g. product data source 110-A, 110-B, 110-N, that validation failed, and that further or different data/information is needed. In this case, product data enrichment module 190 can be utilized to enrich, e.g. complete, the product data with the necessary information. In yet another example, the system 100 can be used to create original designs of products, which means that original rich product data can be created 'online' on the system 100.

Further, the repository 160 may be configured to extract metadata describing the characteristics of the product/part and of the manufacturing process from the stored product data for further processing within the system 100. The product data repository 160 may be located centrally and can be part of the system 100. In this case, the repository 160 may be cloud-based and the rich product data are stored remotely on the cloud. In another embodiment, the rich product data may be stored decentralized, for example stored locally with the respective data source(s) 110-A, 110-B, 110-N. For example, an owner, creator or holder of product data may store product data 112-A, 112-B, 112-AB, 112-N outside of the central platform/system 100 locally within separate storage media.

In an embodiment of the present disclosure, the system 100 comprises multiple modules 170, 172, 174, 176, 178, 180, 182, 184, 190, at least one processor 102 and at least one memory 104. The at least one memory 104 may include any of a wide variety of memory devices including volatile and non-volatile memory devices, and the at least one processor 104 may include one or more processing units. The modules 170, 172, 174, 176, 178, 180, 182, 184, 190 each include an application or process, wherein the processor 102 and memory 104 are utilized by the modules 170, 172, 174, 176, 178, 180, 182, 184, 190 for performing, executing the applications. Of course, the at least one processor 102 may be configured to perform only the processes, applications described herein or can also be configured to perform other processes.

Utilizing the system 100 and one or more of the modules 170, 172, 174, 176, 178, 180, 182, 184, 190 the genuine (digital) product 154, along with a warranty certificate 156 providing proof to standard is manufactured and delivered to the customer/buyer. In an embodiment, the proof to standard is achieved using the following formula to validate the product/part as the genuine, digitally manufactured product 154:

$$\text{Genuine Digital Product} = \text{Physically Unclonable Function (PUF)} + \text{Blockchain-based Evidence of Compliance to Standard}$$

Trust anchor module 170 is configured via computer executable instructions to create a non-fungible token (NFT) to represent the product on NFT Platform 172. The NFT includes the characteristics of the product, for example used both by matching module 174 to identify the product to buyers and traceability module 176 to validate manufacturing process(es), as well as a physically unclonable function (PUF) which will uniquely identify the product once produced.

The PUF is a unique physical mark or characteristic that can only be placed onto/into the product from the original product data. Cloning the part will not produce a perfect copy of the PUF and the part will therefore fail the proof to standard test. PUFs are available in two main categories: 1) existing and unique characteristic(s) of the product—such as imperfections of a metal part, chemical signature of a liquid, or radio noise emitted from a chipset; 2) a purposefully placed identifier such as an uncopiable or unreproducible QR code, shape matrix, or dithered mark.

In an embodiment, the trust anchor module 170 is configured to add a purposefully placed identifier such as an uncopiable or unreproducible code, e.g. QR code, shape matrix or dithered mark to the product data. Different types of identifiers may be used on different classes of products.

When a product request 152 is received, matching module 174 is configured via computer executable instructions to match or pair the product data of the requested product with manufacturing data, selected from the manufacturing data sources 140-A, 140-B, 140-N, based on manufacturing characteristics and criteria for producing the requested product. Specifically, the matching module 174 is configured to match the product data of the product with manufacturing data of at least one manufacturing data source selected from the plurality of manufacturing data sources 140-A, 140-B, 140-N. For example, an end user would like to buy bearings for an electromotor. Based on the rich product data (basic shape data and manufacturing instructions) for the bearing, the matching module 174 selects at least one manufacturing data source, e.g. manufacturer, for example source 140-A, that can produce the bearing as requested by the end user.

After selection of the manufacturer/producer, the rich product data, encrypted and/or uncopiable, are provided to the manufacturer/producer for producing the product, for example utilizing manufacturing execution sequence module 182 that provides the necessary manufacturing instructions to the manufacturer. The manufacturing execution sequence module 182 may be located centrally within the system 100, wherein the system 100 provides and transmits those instructions directly to the manufacturer. In another embodiment, the rich product data are transmitted to an industrial edge device of the manufacturer, wherein the industrial edge device will then facilitate manufacturing according to the manufacturing instructions. The product/part 154 is then produced for example via subtractive manufacturing, additive manufacturing, robotic assembly, etc., as well as traditional manufacturing/production methods that can be offered on the exchange 100 as Manufacturing as a Service (MaaS) or Production as a Service (PaaS).

In an exemplary embodiment, traceability module 176 is configured via computer executable instructions to receive and store production records in a blockchain ledger, compare the productions records with the encrypted product characteristics, stored in the NFT platform 172, and generate a warranty certificate 156 if the product has been produced according to the product data and manufacturing characteristics/criteria. The production records include but are not limited to ingredients (additive manufacturing), materials, machine settings, tolerances, quality results, qualification/certification of personnel, e.g. technician handling production etc., as provided by the manufacturer of the product.

The system 100 further comprises an e-commerce module 178 that is configured via computer executable instructions to facilitate buying and selling of products and associated services, including transmitting of funds. For example, the e-commerce module 178 is configured to facilitate buying and selling of the products, based on product requests 152, and transmitting funds between participating such parties, as customers (buyers of products), manufacturers/producers and product data creators. Further, the e-commerce module 178 can be configured to charge fee(s) per transaction(s) for the provider of the system 100, e.g. the 3-sided marketplace.

For example, digital escrow fee(s) may be charged to the creators/providers of the product data, for securely holding and storing the product data in the system 100, for example in the repository 160 and/or NFT platform 172. Such digital escrow fee(s) can be recurrent (e.g. monthly, yearly fee) or a one-time fee or a fee per usage of the product data. Furthermore, additional fees may be charged to the customers/buyers and/or manufacturers per transaction(s) by the system/marketplace provider.

In another exemplary embodiment, the system 100 may comprise a carbon footprint module 180 configured via computer executable instructions to calculate carbon footprint(s) information 158 for manufactured and produced genuine products 154.

For example, the carbon footprint module 180, in connection with or utilizing other modules or components, for example the repository 160, is configured to calculate or estimate a traditional carbon footprint for a requested product based on traditional manufacturing and transportation means. Further, the carbon footprint module 180, utilizing for example the production records and transportation information, is configured to calculate an actual carbon footprint of the product 154 that is being produced and shipped to the customer/buyer, and to compare the traditional carbon footprint with the actual carbon footprint. Based on the comparison, the carbon footprint module 180 is configured to calculate and issue carbon dioxide ($CO_2$) reduction or savings. Utilizing the platform/system 100, the product 154 can be manufactured locally and at or near the point of need which reduces the carbon footprint drastically, compared to for example a product that has traditionally been produced in Asia and then shipped to Europe or North America.

In another embodiment of the present disclosure, the system 100 may comprise or may be configured as data management system that allows tracking of how many parts/products a particular customer/buyer has purchased, when the parts/products were purchased, and/or when they were installed. The system 100 may automatically track a part when it was installed in order to calculate when the part should be replaced or repaired. Further, the system 100 may digitally or virtually connect to a part that has been installed to monitor an actual use/condition of the part in order to ascertain when the part should be replaced or repaired. The data management system may be configured such that parts/products are automatically re-ordered for the customer/buyer, allowing the customer/buyer to have a lean inventory level.

In an embodiment, the system 100 is a cloud-based or remote computing system. This means for example that data processing and performing of routines and methods are performed remotely via a cloud computing. The system 100 with its components, such as modules 170, 174, 176, 178, 180, 182, 184, 190, NFT platform 172, repository 160, and interfaces 120, 130, 150, may be embodied as software or a combination of software and hardware. The modules, platform and interfaces may be separate components or may be existing components programmed to perform a method as described herein. For example, the repository 160 may be incorporated into an existing database or storage medium, or the trust anchor module 170 may be incorporated, for example programmed, into an existing encryption device, by means of software.

FIG. 2 illustrates a schematic diagram of a system 200 for reducing carbon dioxide emissions in accordance with an exemplary embodiment of the present disclosure.

Carbon markets exist under both mandatory (compliance) schemes and voluntary programs. Compliance markets are created and regulated by mandatory national, regional, or international carbon reduction regimes. Voluntary markets function outside of compliance markets and enable companies and individuals to purchase carbon offsets on a voluntary basis with no intended use for compliance purposes. Compliance offset market credits may in some instances be purchased by voluntary, non-regulated entities, but voluntary offset market credits, unless explicitly accepted into the compliance regime, are not allowed to fulfill compliance market demand.

The terms carbon offset and carbon offset credits (or simply 'offset credit') may be used interchangeably, though they can mean slightly different things. A carbon offset broadly refers to a reduction in GHG emissions—or an increase in carbon storage, e.g. through land restoration or the planting of trees, —that is used to compensate for emissions that occur elsewhere. A carbon offset credit is a transferrable instrument certified by governments or independent certification bodies to represent an emission reduction of one metric ton of CO2, or an equivalent amount of other GHGs. The key concept is that offset credits are used to convey a net climate benefit from one entity to another.

As described earlier, system 100 comprises the carbon footprint module 180 that is configured via computer executable instructions to calculate carbon footprint(s) information 158 for manufactured and produced genuine products 154.

For example, the carbon footprint module 180, in connection with or utilizing other modules or components, for example the repository 160, is configured to calculate or estimate a traditional carbon footprint for a requested product based on traditional manufacturing and transportation means. Further, the carbon footprint module 180, utilizing for example the production records and transportation information, is configured to calculate an actual carbon footprint of the product 154 that is being produced and shipped to the customer/buyer, and to compare the traditional carbon footprint with the actual carbon footprint. Based on the comparison, the carbon footprint module 180 is configured to calculate and issue carbon dioxide ($CO_2$) reduction or savings. Utilizing the platform/system 100, the product 154 can be manufactured locally and at or near the point of need which reduces the carbon footprint drastically, compared to for example a product that has traditionally been produced in Asia and then shipped to Europe or North America.

When the product 154, as requested by a buyer/consumer via request 152, is manufactured, embedded manufacturing execution sequence module 182 (see FIG. 1) coordinates production of the part/product/assembly. Bill of Process Execution Engine (BOPEX®), provided by Siemens®, is an example of a manufacturing execution sequence module 182 compatible with additive, subtractive, complex and formulated manufacturing, and can be incorporated for example into an industrial edge device that decodes and executes manufacturing instructions and also calculates the actual (true) carbon footprint, using an embedded carbon footprint module 180, for example the SiGreen® sustainability algorithm, provided by Siemens®.

Production records and shipping information for the respective product(s) 154 are transmitted to a blockchain ledger. Specifically, ingredients/materials, machine settings, quality results, qualification/certification of manufacturing personnel (e.g. technician), and Product Carbon Footprint (PCF) are sent, for example by an industrial edge device, to the blockchain ledger, incorporated in trusted traceability module 176.

In an embodiment of the present disclosure, the system 100, as described with reference to FIG. 1, may be registered as an emissions reduction methodology, for example with an independent certification body, such as Verified Carbon Standard or The Gold Standard, herein referred to as certification body 240. Further, for each manufactured product 154, the corresponding contract or documented transaction, can be registered as associated project to the emissions reduction methodology with the certification body 240.

Provider and/or operator of the system/marketplace 100 registers the system/marketplace 100 with the certification body 240. As used herein, the system operator is an entity or party that operates, manages, or runs the system 100. The system operator and system provider can be the same entity, or they can be different entities.

Contract(s)/transaction(s) of the manufactured products 154 are declared to the certification body 240, along with carbon dioxide offsets, herein shortly referred to as carbon offsets, for the respective product 154. The carbon offsets, representing carbon savings, are also communicated to the creator(s) 110-A, 110-B, 110-N of the digital assets. Based on the received carbon offsets, the certification body 240 issues carbon offset credit(s), for example to the system 100, via electronic communication, or to the system operator or provider. The carbon offset credits can be traded on voluntary carbon markets, such as carbon marketplace 260, can be used to offset carbon emissions of manufacturing business, or can be used as a hedge against rising prices. Interaction, such as trading, with the carbon marketplace 260 may be facilitated through the system 100, in an automated manner, such that for example the system 100 is configured to automatically transmit or forward carbon credits to the carbon marketplace 260. In another example, the system operator or system provider, i.e. receiving party of the carbon credits, may interact with the carbon marketplace 260.

The carbon savings (offsets) in connection with manufactured products 154 are transmitted to the certification body 240. Such transmissions can be automatic or manual. In an embodiment, the system 100 is configured to automatically transmit the carbon dioxide reduction to the certification body 240, along with product information, such as transactions as stored in the system 100 to proof the carbon dioxide savings. For example, the traceability module 176 is configured to store the carbon dioxide reduction as carbon offset in the blockchain ledger and provide the carbon offset to the certification body 240 via a smart contract on the blockchain ledger, incorporated in trusted traceability module 176. In return, the certification body 240 provides and transmits carbon offset credit(s). In other examples, the carbon savings (offsets) may be transmitted or communicated to the certification body 240 in other ways, such as for example e-mail or another type of electronic communication.

The creator(s)/owner(s) 110-A, 110-B, 110-N of the product data, see FIG. 1, may receive a portion of a transaction fee with respect to a production of the product(s) 154 and a carbon reduction certificate (stored on the blockchain ledger) that can be used to prove compliance with carbon reduction pledges. In another example, the creator(s) 110-A, 110-B, 110-N may receive the carbon offset credits (or a portion of carbon offset credits) instead of a portion of the transaction fee.

FIG. 3 illustrates a flowchart relating to a method 300 for reducing carbon dioxide emission in accordance with an exemplary embodiment of the present disclosure. The method 300 is performed using system 100 as described with reference to FIG. 1 and system 200 as described with reference to FIG. 2.

Method 300 may start at 310. Act 320 comprises automatically calculating carbon dioxide reduction (carbon offset) of a manufactured product 154. Act 330 comprises storing the calculated carbon dioxide reduction, for example in a blockchain ledger within system 100. Act 340 comprises transmitting the calculated carbon dioxide reduction to a certification body 240, for example via a smart contract on the blockchain ledger, or other type of (electronic) communication. Act 350 comprises receiving carbon offset credit, such as tradable greenhouse gas credits, issued by the certification body 240. The carbon offset credit may be issued to the system operator, the system provider, and/or the creator(s) of the product data (digital assets) 110-A, 110-B, 110-N for each asset from a portfolio that is sourced and manufactured through the platform/system 100. The carbon offset credit(s) may be received via an electric communication, for example received by the system/marketplace 100, or by the operator or provider of the system 100. At 360, the method 300 may end.

It should be appreciated that acts associated with the above-described methodologies, features, and functions (other than any described manual acts) may be carried out by one or more data processing systems or modules, such as for example modules 170, 172, 174, 176, 178, 180, 182 via operation of at least one processor 102 and at least one memory 104. As used herein, a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. As discussed previously, the modules 170, 172, 174, 176, 178, 180, 182 and/or processor 102 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the modules 170, 172, 174, 176, 178, 180, 182/processor 102 with the executable instructions (e.g., software/firmware apps) loaded/installed into a memory (volatile and/or non-volatile), which are currently being executed and/or are available to be executed by the processor 102 to cause the processor 102 to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

Further, it should be understood, that reference to "a processor" may include multiple physical processors or cores that are configured to carry out the functions described herein. It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C#, C++, Scala, R, MATLAB, Clojure, Lua, Go or any other form of code that can be programmed/configured to cause at least one processor to carry out the acts and features described herein. Still further, results of the described/claimed processes or functions may be stored in a computer-readable medium, displayed on a display device, and/or the like.

The invention claimed is:

1. A system for reducing carbon dioxide emissions using trusted on-demand distributed manufacturing including at least one processor and at least one memory, the system comprising:
   a first interface configured to receive product data from a product data source,
   a second interface configured to exchange manufacturing data from a manufacturing data source,
   a matching module configured via computer executable instructions to
      match the product data with the manufacturing data based on manufacturing characteristics for producing a product as described in the product data,
   a carbon footprint module configured via computer executable instructions to
      determine a traditional carbon footprint and an actual carbon footprint of the product, and
      determine a carbon dioxide reduction based on the traditional and the actual carbon footprint of the product, and
   wherein the system is configured to automatically transmit the carbon dioxide reduction to a certification body.

2. The system of claim 1,
   wherein the system is configured to automatically transmit the carbon dioxide reduction of the product via an electronic communication to the certification body.

3. The system of claim 1, further comprising:
   a traceability module configured via computer executable instructions, in combination with a trust anchor module, to
      receive and store production records of the product in a blockchain ledger,
      compare the production records with the product characteristics stored in a non-fungible token (NFT) platform, and
      generate a warranty certificate if the product is manufactured according to the manufacturing characteristics and production records.

4. The system of claim 2,
   wherein the traceability module is configured to
      store the carbon dioxide reduction as carbon offset in the blockchain ledger, and
      provide the carbon offset to the certification body via a smart contract on the blockchain ledger.

5. The system of claim 2,
   wherein the production records comprise ingredients, materials, machine settings, quality results, tolerances of the product, and/or qualification information of manufacturing personnel.

6. The system of claim 1,
   wherein the traditional carbon footprint of the product is determined based on traditional manufacturing and transportation means, examples of the traditional carbon footprint being stored in the system.

7. The system of claim 1,
   wherein the actual carbon footprint of the product is determined using a sustainability algorithm.

8. The system of claim 1, further comprising:
   a manufacturing execution sequence module configured to execute the manufacturing instructions utilizing an execution engine for producing the product.

9. The system of claim 8,
   wherein the manufacturing execution sequence module is configured to calculate the actual carbon footprint of the product.

10. The system of claim 1, further comprising:
    a trust anchor module configured via computer executable instructions to
       add instructions for a physically unclonable function (PUF) to the product data,
       generate a non-fungible token (NFT) to represent a product on an NFT-platform.

11. The system of claim 1, further comprising:
    a repository storing the product data, the product data comprising basic shape data describing a specific product and manufacturing characteristics including manufacturing instructions, quality targets and tolerances of the product.

12. The system of claim 1, further comprising:
    a third interface configured to receive a product request, wherein the product request includes a request for the product and manufacturing criteria including a timeline, materials, price, and/or manufacturing location.

13. The system of claim 1, further comprising:
    an e-commerce module configured via computer executable instructions to
       calculate costs and fees in connection with manufacturing of the product, and
       facilitate buying and selling of the product and associated services, including transmitting of funds.

* * * * *